United States Patent
Zhou et al.

(10) Patent No.: US 10,277,841 B2
(45) Date of Patent: Apr. 30, 2019

(54) IMAGE CAPTURE CONTROL METHOD AND APPARATUS, AND IMAGE CAPTURE DEVICE

(71) Applicant: Beijing Zhigu Rui Tuo Tech Co., Ltd., Beijing (CN)

(72) Inventors: Liang Zhou, Beijing (CN); Dayong Ding, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 12 days.

(21) Appl. No.: 15/378,433

(22) Filed: Dec. 14, 2016

(65) Prior Publication Data

US 2017/0187970 A1 Jun. 29, 2017

(30) Foreign Application Priority Data

Dec. 28, 2015 (CN) .......................... 2015 1 1000941

(51) Int. Cl.
*H04N 5/353* (2011.01)
*H04N 5/355* (2011.01)

(52) U.S. Cl.
CPC ....... *H04N 5/3535* (2013.01); *H04N 5/35554* (2013.01)

(58) Field of Classification Search
CPC .......................... H04N 5/3535; H04N 5/35554
See application file for complete search history.

(56) References Cited

U.S. PATENT DOCUMENTS

| 7,492,391 | B1 * | 2/2009 | Kaplinsky | ................. G06T 5/50 348/211.3 |
| 8,803,990 | B2 * | 8/2014 | Smith | ................. H04N 5/2355 348/218.1 |
| 9,172,889 | B2 * | 10/2015 | Li | ........................ H04N 5/2353 |
| 9,282,256 | B1 * | 3/2016 | Shan | ................... H04N 5/23254 |
| 2005/0280702 | A1 * | 12/2005 | Nakano | .............. H04N 13/0239 348/42 |
| 2008/0303912 | A1 | 12/2008 | Ahonen | |

(Continued)

FOREIGN PATENT DOCUMENTS

| CN | 101047786 A | 10/2007 |
| CN | 101088284 A | 12/2007 |

(Continued)

*Primary Examiner* — Timothy J Henn
(74) *Attorney, Agent, or Firm* — Sheppard Mullin Richter & Hampton LLP (57) ABSTRACT

This application discloses an image capture control method and apparatus, and an image capture device, wherein the method comprises: configuring different exposure periods for at least two photosensitive areas of a photosensitive array; determining start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and controlling exposure of the corresponding photosensitive areas according to the determined exposure periods and the start exposure times of the exposure periods. This application can improve quality of an HDR image by using a total exposure time as short as possible.

25 Claims, 5 Drawing Sheets

(56) References Cited

U.S. PATENT DOCUMENTS

| | | | |
|---|---|---|---|
| 2010/0177208 A1 | 7/2010 | Tamaru et al. | |
| 2010/0309333 A1* | 12/2010 | Smith | H04N 5/235 348/230.1 |
| 2010/0329554 A1* | 12/2010 | Zhai | G09G 3/2003 382/167 |
| 2012/0218426 A1* | 8/2012 | Kaizu | H04N 5/35554 348/208.4 |
| 2013/0135506 A1* | 5/2013 | Kobayashi | H04N 5/35554 348/311 |
| 2014/0218575 A1* | 8/2014 | Yanai | H04N 5/3532 348/296 |
| 2014/0232929 A1* | 8/2014 | Ichikawa | H04N 5/2355 348/362 |
| 2015/0130959 A1 | 5/2015 | Kao et al. | |
| 2015/0244916 A1* | 8/2015 | Kang | H04N 5/2353 348/222.1 |
| 2015/0264273 A1* | 9/2015 | Feder | H04N 5/35554 348/239 |
| 2018/0077367 A1* | 3/2018 | Feder | H04N 5/265 |

FOREIGN PATENT DOCUMENTS

| | | |
|---|---|---|
| CN | 101795355 A | 8/2010 |
| CN | 102629995 A | 8/2012 |
| CN | 104639842 A | 5/2015 |
| CN | 105163039 A | 12/2015 |

\* cited by examiner

IMAGE CAPTURE CONTROL METHOD AND APPARATUS, AND IMAGE CAPTURE DEVICE

CROSS REFERENCE TO RELATED APPLICATION

The present application is based on and claims the benefit of priority to Chinese Application No. 201511000941.6, filed on Dec. 28, 2015, the entire contents of which are incorporated herein by reference.

TECHNICAL FIELD

This application relates to the field of communications technologies, and in particular, to an image capture control method and apparatus, and an image capture device.

BACKGROUND

A high-dynamic range (HDR) image, compared with an ordinary image, may provide more image details of a larger dynamic range. Currently, in the HDR solution, multiple images having different exposure time lengths are captured continuously and synthesized, and the multiple images captured continuously are generally completed serially, that is, only after exposure of a current image is completed, capture of a next image begins to be performed, and therefore, a total HDR image capture time is accumulation of respective exposure time lengths corresponding to multiple images.

SUMMARY

A brief overview about this application is given below, so as to basically understand some aspects about this application. It should be understood that, this overview is not an exhaustive overview about this application. It is neither intended to determine a key or important part of this application, nor intended to limit the scope of this application. It merely aims to give some concepts in a simplified form, so as to be used as the foreword of a more detailed description discussed later.

Embodiments of this application provide an image capture control method and apparatus, and an image capture device.

According to a first aspect, an embodiment of this application provides an image capture control method, comprising:

configuring different exposure periods for at least two photosensitive areas of a photosensitive array;

determining start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and controlling exposure of the corresponding photosensitive areas according to the determined exposure periods and the start exposure times of the exposure periods.

According to a second aspect, an embodiment of this application further provides an image capture control apparatus, comprising:

an exposure period configuration module, configured to configure different exposure periods for at least two photosensitive areas of a photosensitive array;

a start exposure time determining module, configured to determine start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and an exposure control module, configured to control exposure of the corresponding photosensitive areas according to the determined exposure periods and the start exposure times of the exposure periods.

According to a third aspect, an embodiment of this application further provides an image capture device, comprising:

a digital image sensor, a processor, a communications interface, a memory and a communications bus, wherein the processor, the communications interface, the memory and the image sensor complete mutual communication by using the communications bus; and the memory is configured to store at least one instruction, wherein the instruction enables the processor to perform the following operations:

configuring different exposure periods for at least two photosensitive areas of a photosensitive array;

determining start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and controlling exposure of the corresponding photosensitive areas according to the determined exposure periods and the start exposure times of the exposure periods.

According to the solutions provided in the embodiments of this application, different exposure periods are configured for at least two photosensitive areas of a photosensitive array, different start exposure times are determined for the different exposure periods, and then the photosensitive areas are controlled in parallel to successively begin exposure, and therefore, image capture of the photosensitive array is completed in a longest exposure period of the exposure periods, which improves exposure efficiency, and helps reduce an offset extent of an average center of different parts of a same relative motion object of sub-images captured by different photosensitive areas. In a dynamic scenario, that is, in a case in which a relative motion occurs between the photosensitive array and a to-be-shot scenario, calculation complexity needed by synthesis of an HDR image based on sub-images is improved, motion blur of the synthesized HDR image is reduced, and quality of the HDR image is improved.

By means of detailed description about optional embodiments of this application made below with reference to accompanying drawings, these and other advantages of this application are more obvious.

BRIEF DESCRIPTION OF THE DRAWINGS

This application may be better understood by referring to the following description made with reference to accompanying drawings, wherein same or similar reference numbers are used in all the accompanying drawings to denote same as similar components. The accompanying drawings along with the following detailed description are comprised in this specification and form a part of this specification, and are used to further exemplify optional embodiments of this application and explain principles and advantages of this application. In the accompanying drawings.

Persons skilled in the art should understand that, elements in the accompanying drawings are shown only for purpose of simplicity and clarity, and are unnecessarily drawn in proportion. For example, sizes of some elements in the accompanying drawings may be enlarged relative to other elements, so as to help improve understanding on the embodiments of this application.

DETAILED DESCRIPTION

Exemplary embodiments of this application are described in detail with reference to accompanying drawings below. For sake of clearness and conciseness, not all characteristics of actual implementation manners are described in the specification. However, it should be understood that, in the procedure developing any this type of actual embodiment, lots of decisions specific to the implementation manners have to be made, so as to achieve the specific target of the developers, for example, conform to those limiting conditions related to systems and services, and these limiting conditions may change as the implementation manners differ. Moreover, it should be further understood that, although development work may be quite complex and time-consuming, this development work is only a routine task for persons skilled in the art who benefit from this disclosure.

Herein, it should be further noted that, to avoid blur of this application due to unnecessary details, in the accompanying drawings and the description, only apparatus structures and/or processing steps closely related to solutions according to this application are described, and denotation and description about components and processing that are scarcely related to this application and known by persons of ordinary skill in the art are omitted.

The detailed description of this application is further described in detail hereinafter in connection with accompanying drawings (in several accompanying drawings, same numerals denote same elements) and embodiments. The following embodiments are used to describe this application, but not used to limit the scope of this application.

It can be understood by a person skilled in the art that the terms such as "first" and "second" in this application are only used to differentiate different steps, devices or modules, and the terms neither represent any specific technical meaning, nor represent an inevitable logic sequence between the steps, the devices, or the modules.

Figure 1:
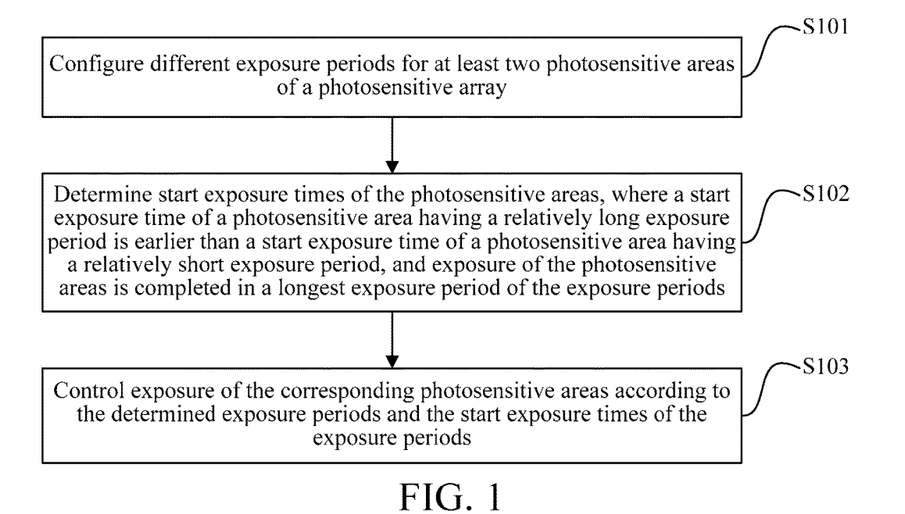
FIG. 1 is a flowchart of an image capture control method provided in an embodiment of this application.

FIG. 1 is a flowchart of an image capture control method provided in an embodiment of this application. The image capture control method provided in this embodiment of this application may be executed by an image capture control apparatus, and the image capture control apparatus performs image capture control by executing the image capture control method. The device representation form of the image capture control apparatus is not limited. For example, the image capture control apparatus may be an independent component (the independent component may be but not limited to a data handling module or control circuit), and the component performs image capture by controlling a photosensitive array. Alternatively, for another example, the image capture control apparatus may be used as a module or control circuit and integrated as a part of an image capture device comprising the photosensitive array, so as to implement image capture control on the photosensitive array, and the like. The image capture control apparatus performs control such as resetting, and/or reading output on the photosensitive unit in a manner of outputting a control signal to the photosensitive array. Specifically, as shown in FIG. 1, the image capture control method provided in this embodiment of this application comprises:

S101: Configure different exposure periods for at least two photosensitive areas of a photosensitive array.

The photosensitive array comprises multiple photosensitive units in array distribution, and the photosensitive units may also be referred to as pixel units. An entire area of the photosensitive array may be divided into multiple sub-areas (that is, at least two photosensitive areas) according to an actual need, and different exposure periods are configured for the photosensitive areas, that is, the photosensitive array at least comprises two photosensitive areas having different exposure periods. The exposure period is an effective time length of continuous exposure of a photosensitive unit in the photosensitive area. Each photosensitive area comprises at least one photosensitive unit.

S102: Determine start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods.

The start exposure time is equivalent to a start time point starting from the exposure period. In the technical solution provided in this embodiment of this application, exposure periods of different photosensitive areas are different, and start exposure times of the different photosensitive areas are also different. The start exposure times of the exposure periods of the photosensitive areas are determined according to lengths of the exposure periods. Specifically, a total capture time of the whole photosensitive array is a longest exposure time of the exposure periods (that is, exposure of the photosensitive areas is completed in a longest exposure period of the exposure periods), and a start exposure time of a photosensitive area having a relatively long exposure period is earlier than a start exposure time of a photosensitive area having a relatively short exposure period.

S103: Control exposure of the corresponding photosensitive areas according to the determined exposure periods and the start exposure times of the exposure periods.

After the exposure periods and the start exposure times of the exposure periods are determined, exposure of the corresponding photosensitive areas may be controlled according to the determined exposure periods and start exposure times of the exposure periods. For example, a photosensitive array is divided into three photosensitive areas A1, A2 and A3, exposure periods of these three areas are separately T1, T2 and T3, $T_3 > T_2 > T_1$, and if a start exposure time of T3 is earlier than a start exposure time of T2, and the start exposure time of T2 is earlier than a start exposure time of T1, the photosensitive area A3 first begins exposure, then in a continuous exposure process of the photosensitive area A3, the photosensitive area A2 begins exposure, and then in a continuous exposure process of the photosensitive area A2, the photosensitive area A1 begins exposure, that is, the three photosensitive areas A1, A2 and A3 perform exposure in parallel. The three photosensitive areas have unaligned start exposure times because of lengths of respective corresponding exposure times of the three photosensitive areas, and after continuous exposure is performed for a time length T3, photosensitive units in the photosensitive array end effective exposure.

Figure 2A:
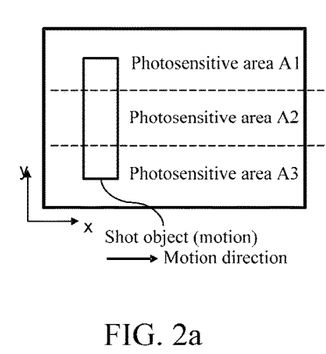
FIG. 2a is an example of an optional application scenario provided in an embodiment of this application.
Figure 2B:
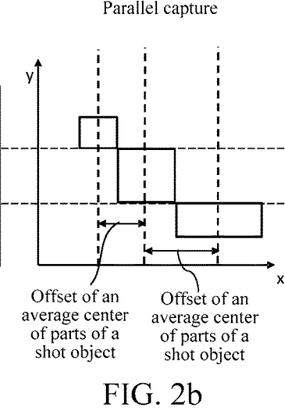
FIG. 2b is an example of serial HDR capture provided in an embodiment of this application.

The inventor of this application points out that, multiple sub-images having different exposure times on which synthesis of an HDR image is based may be implemented in a serial capture manner or parallel capture manner, the serial capture means that exposure periods of any two sub-images in a process of capturing multiple sub-images needed by synthesis of HDR do not overlap, and the parallel capture means that exposure periods of any two sub-images in a process of capturing multiple sub-images needed by synthesis of HDR overlap. As shown in FIG. 2a and FIG. 2b, if line-by-line control is performed in the serial exposure manner, the photosensitive area A2 begins exposure after exposure of the photosensitive area A1 is completed, the photosensitive area A3 begins exposure after exposure of the photosensitive area A2 is completed, until exposure of the photosensitive area A3 ends, capture of the photosensitive array is completed. In this way, the total capture time of the whole photosensitive array is accumulation of the exposure periods of the three photosensitive areas T1+T2+T3, which is the needed total capture time length. Moreover, in the technical solution provided in this embodiment of this application, exposure of different photosensitive areas are controlled in parallel, which helps perform effective balance between the total capture time and image quality, and multiple sub-images of different exposure periods of different photosensitive areas are acquired by using a relatively short total capture time (such as T3).

Figure 2C:
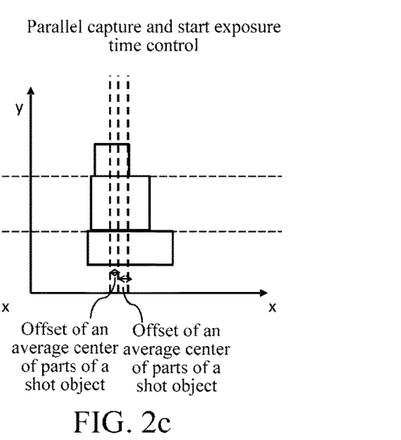
FIG. 2c is an example 1 of parallel and start exposure time controlled HDR capture provided in an embodiment of this application.
Figure 2D:
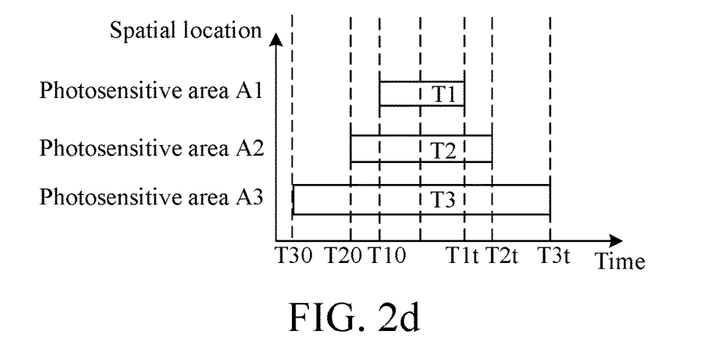
FIG. 2d is an example 2 of parallel and start exposure time controlled HDR capture provided in an embodiment of this application.

Moreover, during a practice of the embodiments of this application, the inventor of this application finds that, if in the total capture time T1+T2+T3, a relative motion exists between the photosensitive array and a shot object (which comprises that the shot object is in motion and the photosensitive array is motionless, or the photosensitive array is in motion and the shot object is motionless, or both the photosensitive array and the shot object are in motion but the two are not relatively motionless), a relatively large offset may exist in an average center of different parts of a same motion object in sub-images captured by the photosensitive areas from the perspective of a time axis (for example, during serial capture, an offset $$\frac{T_2 + T_1}{2}$$

or an offset $$\frac{T_3 + T_2}{2}$$

may exist), and a larger extent of the relative motion between the photosensitive array and the shot object indicates a larger actual displacement occurring in the object during shooting. In this way, when HDR image synthesis is performed based on the sub-images separately acquired by the photosensitive areas, complexity of data handling such as object alignment is increased, motion blur exists in the synthesized HDR image because of an offset of an average center of parts of the object in different photosensitive areas, and quality of the HDR image is reduced. Therefore, in the technical solution provided in this embodiment of this application, three photosensitive areas have different start exposure times because of respective corresponding exposure time lengths of the three photosensitive areas, and a start exposure time of a the photosensitive area having a relatively long exposure period is earlier than a start exposure time of a the photosensitive area having a relatively short exposure period. As shown in FIG. 2a, FIG. 2c and FIG. 2d, the start exposure time of the photosensitive area A3 is earlier than the start exposure time of the photosensitive area A2, the start exposure time of the photosensitive area A2 is earlier than the start exposure time of the photosensitive area A1, and the exposure periods of both the photosensitive area A1 and the photosensitive area A2 expire before the exposure period of the photosensitive area A2 expires. In this way, an exposure period difference between the photosensitive areas may cause the offset extent of the average center of different parts of the same object in the sub-images to be reduced, which, as shown in FIG. 2c, therefore helps simplify calculation complexity of performing subsequent synthesis processing such as object alignment based on the sub-images, and improves quality of the synthesized HDR image.

Therefore, it can be seen that, according to the solutions provided in the embodiments of this application, different exposure periods are configured for at least two photosensitive areas of a photosensitive array, different start exposure times are determined for the different exposure periods (a relatively long exposure period begins exposure relatively early, and a relatively short exposure period begins exposure relatively late), and then the photosensitive areas are controlled in parallel to successively begin exposure, and therefore, image capture of the photosensitive array is completed in a longest exposure period of the exposure periods, which improves exposure efficiency, and helps reduce an offset extent of an average center of a same relative motion object of sub-images captured by different photosensitive areas. In a dynamic scenario (such as a scenario in which a relative motion exists between the photosensitive array and a shot scenario), calculation complexity needed by synthesis of an HDR image based on sub-images is improved, motion blur of the synthesized HDR image is reduced, and quality of the HDR image is improved.

An embodiment of this application provides any technical solution. Start exposure moments of photosensitive areas are staggered, wherein setting may be performed flexibly when conditions that a start exposure time of a photosensitive area having a relatively long exposure period is earlier than a start exposure time of a photosensitive area having a relatively short exposure period, and exposure of the photosensitive areas is completed in a longest exposure period of the exposure periods are satisfied. For example, on the basis of satisfying the foregoing conditions, a delay time length may be set, and the start exposure moments of the photosensitive areas are sequentially spaced by the delay time length. Certainly, delay time length of start exposure times of different photosensitive areas may be the same or different, so as to satisfy actual diversified application requirements. Optionally, the determining start exposure times of the photosensitive areas comprises: aligning midpoints of the exposure periods to determine the start exposure times of the photosensitive areas relative to a reference time. As shown in FIG. 2d, midpoints of the exposure periods T1, T2, and T3 of the photosensitive areas A1, A2, and A3 are aligned, start points of the exposure periods T1, T2, and T3 after alignment have a difference on the time axis, and the start exposure times of the exposure periods may be determined after the difference is combined with the reference time. Exposure control of the corresponding photosensitive area is performed by using the exposure parameter determined in the solution, and the offset of the average center of the sub-images separately captured by the exposure areas may be reduced as much as possible, thereby simplifying calculation complexity of performing subsequent synthesis processing such as object alignment based on the sub-images, and improving quality of the synthesized HDR image. Further, optionally, the reference time is a start exposure time of a photosensitive area corresponding to the longest exposure period. In the solution, a start exposure time of another exposure period is determined by using the start exposure time of the photosensitive area corresponding to the longest exposure period as the reference time, which is convenient to control.

With reference to any technical solution provided in the embodiments of this application, optionally, the configuring different exposure periods for at least two photosensitive areas of a photosensitive array comprises: dividing the photosensitive array into the at least two photosensitive areas; and configuring different exposure periods for the at least two photosensitive areas according to optical parameter distributions corresponding to the at least two photosensitive areas. The optical parameters may comprise but not limited to at least one of the following: a luminance, a contrast, a saturation and the like. For example, a relatively short exposure time may be configured for a photosensitive area whose average luminance is relatively large, a relatively long exposure time may be configured for a photosensitive area whose average luminance is relatively small, and the like. In the solution, the corresponding exposure periods are configured according to the optical parameter distribution of the photosensitive area, and therefore, the configured exposure periods adapt to the optical parameter distribution of the photosensitive area, and effective balance is performed between exposure efficiency and sub-image capture quality.

Optionally, the dividing the photosensitive array into the at least two photosensitive areas comprises: dividing the photosensitive array into the at least two photosensitive areas according to an optical parameter distribution of a sampling image of a scenario. In an actual application, a sampling image of a scenario may be acquired by using an image capture device, and the photosensitive array is divided into two or more than two photosensitive areas according to one or more optical parameter distributions of a luminance, a contrast, and a saturation of the sampling image, and therefore, optical parameters of pixel units in the photosensitive areas obtained through division are distributed relatively uniformly in an allowed range. In the solution, division of photosensitive areas is determined with reference to shooting and sampling situations of a scenario, and different exposure control is performed based on the photosensitive areas obtained through division, thereby improving image capture quality.

Figure 3A:
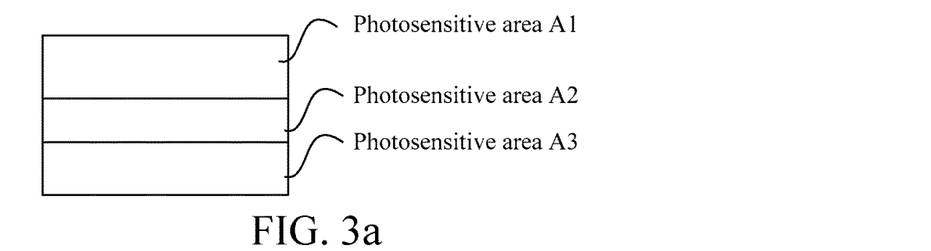
FIG. 3a is an example of dividing a photosensitive area by using a row as a unit provided in an embodiment of this application.

With reference to any technical solution provided in the embodiments of this application, optionally, each photosensitive area of the at least two photosensitive areas comprises at least one row of photosensitive units. In the solution, rows in the photosensitive array may be used as a division unit, an entire area of the photosensitive array is divided into multiple photosensitive areas, and each photosensitive area comprises one or more rows of photosensitive units, as shown in FIG. 3a. In this way, a corresponding photosensitive area may be controlled in a row driving manner, to implement exposure control on the corresponding photosensitive area. It can be understood that, row driving of different photosensitive areas may be performed in parallel, and therefore, multiple photosensitive areas are all in an exposure state at least in a common period. The photosensitive array may be a photosensitive array supporting line-by-line driving. For example, the photosensitive array may be a photosensitive array in a rolling-curtain-type image sensor, or, the photosensitive array may be a digital image sensor supporting driving control performed by using a row as a unit, and the like, and is applied widely.

Figure 3B:
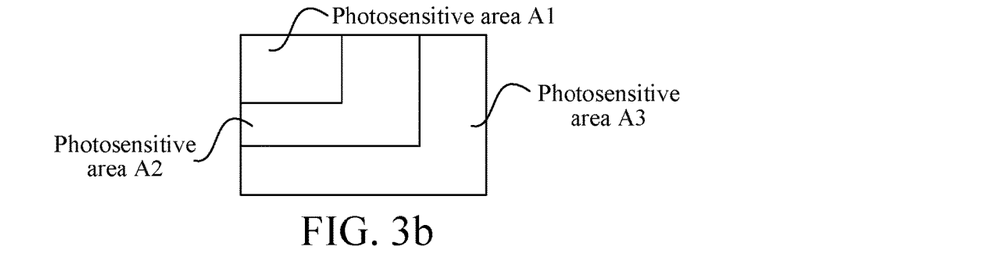
FIG. 3b is an example of dividing a photosensitive area by using a photosensitive unit (pixel) as a unit provided in an embodiment of this application.

Optionally, each photosensitive area of the at least two photosensitive areas comprises at least one photosensitive unit. In the solution, a photosensitive unit (that is, pixel point) in the photosensitive array may be used as a division unit. An entire area of the photosensitive array is divided into multiple photosensitive areas, and each photosensitive area comprises one or more photosensitive units, as shown in FIG. 3b. In this way, exposure control on the corresponding photosensitive area may be implemented in a manner such as one-by-one photosensitive unit driving or local area driving. It can be understood that, row driving of different photosensitive areas may be performed in parallel, and therefore, multiple photosensitive areas are all in an exposure state at least in a common period. The photosensitive array may be a photosensitive array supporting per-pixel-point driving, such as a photosensitive array in a digital image sensor at least a local area of which supports per-pixel-point control. In some cases, an optical parameter distribution difference between neighboring areas in a scenario may also be relatively large, for example, a luminance difference between the sun and cloud in the sky is relatively large, and the solution may be used to perform fine division on photosensitive areas and different exposure control, thereby improving image capture quality.

With reference to any technical solution provided in the embodiments of this application, optionally, the method further comprises: reading data captured by the photosensitive areas in the corresponding exposure periods. A specific manner of data reading is not limited in this embodiment of this application, and an implementation manner is quite flexible. For example, the photosensitive areas of the photosensitive array may share a read circuit, and the read circuit may be shared to read data of the photosensitive areas by means of staggered setting of reading times, but not to such an extent as to generate a conflict. Optionally, the reading data captured by the photosensitive areas in the corresponding exposure periods comprises: reading, during exposure completion of a photosensitive area having a relatively short exposure period to exposure completion of a photosensitive area having a relatively long exposure period, data captured by the photosensitive area having the relatively short exposure period in the exposure period of the photosensitive area; and reading, in response to data reading completion of the photosensitive area having the relatively short exposure period and exposure completion of the photosensitive area having the relatively long exposure period, data captured by the photosensitive area having the relatively long exposure period in the exposure period of the photosensitive area. As shown in FIG. 2d, the data captured by the photosensitive area A1 may be read by using the read circuit in a period of time between an exposure end time T1t of the exposure period T1 and an exposure end time T2t of the exposure period T2; the data captured by the photosensitive area A2 may be read by using the read circuit in a period of time between an exposure end time T2t of the exposure period T2 and an exposure end time T3t of the exposure period T3; the data captured by the photosensitive area A3 may be read after an exposure end time T3t of the exposure period T3. In such data reading control, the read circuit may be shared, so as to reduce costs, and avoid a data reading conflict between different photosensitive areas. For another example, different photosensitive areas may separately correspond to different read circuits, and data captured by corresponding photosensitive areas is separately read by using multiple read circuits. For example, optionally, the reading data captured by the photosensitive areas in the corresponding exposure periods comprises: separately reading, in response to exposure completion of the photosensitive areas, the data captured by the photosensitive areas in the corresponding exposure periods. The solution improves convenience of data reading control. For another example, during reading control, a data holding circuit or the like may be set for a photosensitive area. For example, a voltage is held for data captured by the photosensitive area, and therefore, the voltage of the photosensitive area is held to an appropriate reading time and then corresponding data is read, thereby improving flexibility and convenience of data reading control.

Further, optionally, after the reading data captured by the photosensitive areas in the corresponding exposure periods, the method further comprises: generating an image according to the data captured by the photosensitive areas. The generated image is an HDR image, and a manner of generating an HDR image is quite flexible, which is not limited in this embodiment of this application. Specifically, after the data reading, respective corresponding sub-images of the photosensitive areas may be separately generated according to the data captured by the photosensitive areas in the corresponding exposure periods. For example, a sub-image P1 is generated according to the data captured by the photosensitive area A1 in the exposure period T1, a sub-image P2 is generated according to the data captured by the photosensitive area A2 in the exposure period T2, a sub-image P3 is generated according to the data captured by the photosensitive area A3 in the exposure period T3, and an HDR image is synthesized according to the sub-images P1, P2 and P3; or, after the data reading, corresponding objects of data captured by the photosensitive areas in the corresponding exposure periods may be aligned to synthesize an HDR image; or the like.

During a practice of the embodiments of this application, the inventor of this application further finds that, in some scenarios, a part (such as a photosensitive area) of the photosensitive array is relatively dark (such as a tree shade area in sunlight), and a relatively long exposure time is needed so as to obtain more image details. However, although image capture details are increased by prolonging the exposure time, an excessively long exposure time affects image capture efficiency, and particularly in a situation in which a relative motion exists between the photosensitive array and a shot object, a long exposure time affects image capture quality more obviously. Therefore, when an HDR image is acquired, the entire total capture time of the photosensitive array needs to be reduced as much as possible or is not increased, or in a situation in which a relatively large luminance difference exists between scenarios captured by a same row of the photosensitive array, multiple sub-images may be captured for the photosensitive area, thereby improving image capture quality. For example, the data captured by the photosensitive area may be read multiple times in the exposure period of the photosensitive area, a sub-image of the photosensitive area is generated based on multiple sub-images corresponding to the data that is read multiple times, that is, a sub-image is generated according to the data captured by the photosensitive area in the exposure sub-periods, and then the sub-image of the photosensitive area and sub-images of other photosensitive areas in the photosensitive array are synthesized, so as to generate an HDR image corresponding to the photosensitive array, thereby further improving image capture quality on the basis of not increasing the exposure time length. Optionally, the reading data captured by at least one photosensitive area of the photosensitive areas in an exposure period of the photosensitive area comprises: reading data respectively captured in at least two exposure sub-periods of the exposure period of the photosensitive area, wherein the at least two exposure sub-periods at least comprise a first exposure sub-period and a second exposure sub-period, and the second exposure sub-period comprises the first exposure sub-period and is longer than the first exposure sub-period. As shown in FIG. 2d, the exposure period T3 may be divided into multiple exposure sub-periods, and in the exposure process of the photosensitive area A3, data captured by the photosensitive area A3 in different exposure sub-periods in the exposure process is separately read at exposure times T20, T10, T1t, T2t, and T3t. For example, the data captured by the photosensitive area A3 during the exposure time T30 to the exposure time T20 is read at the exposure time T20, the data captured by the photosensitive area A3 during the exposure time T30 to the exposure time T10 is read at the exposure time T10, the data captured by the photosensitive area A3 during the exposure time T30 to the exposure time T1t is read at the exposure time T10, and so on. Such processing is equivalent to improving image capture quality of the photosensitive area A3 by using a same exposure period.

Further, an implementation manner of reading data captured by the photosensitive area in different exposure sub-periods is quite flexible, which is not limited in the embodiments of this application. For example, the photosensitive area may be coupled to a read circuit, and by means of staggered setting of reading times, the read circuit may be shared in an exposure period to read data of different exposure extents of the photosensitive area, but not to such an extent as to generate a conflict during data reading. Optionally, the reading data respectively captured in at least two exposure sub-periods of the exposure period of the photosensitive area comprises: reading, during expiration of the first exposure sub-period and non-expiration of the second exposure sub-period, data captured by the photosensitive area in the first exposure sub-period; and reading, in response to reading completion of the data captured by the photosensitive area in the first exposure sub-period and expiration of the second exposure sub-period, data captured by the photosensitive area in the second exposure sub-period. As shown in FIG. 2d, the data captured by the photosensitive area A3 during the exposure time T30 to the exposure time T20 is read by using the read circuit in a period of time between the exposure times T20 and T10, the data captured by the photosensitive area A3 during the exposure time T30 to the exposure time T10 is read by using the read circuit in a period of time between the exposure times T10 and T1t, and so on. In such data reading control, the read circuit may be shared, so as to reduce costs, and avoid a conflict of performing data reading multiple times by the photosensitive area in the exposure period. For another example, the photosensitive area may be coupled to multiple read circuits, and the data captured by the photosensitive area in different exposure sub-periods is separately read by using the multiple read circuits. Optionally, the reading data respectively captured in at least two exposure sub-periods of the exposure period of the photosensitive area comprises: separately reading, in response to expiration of the exposure sub-periods, the data captured by the photosensitive area in the corresponding exposure sub-periods. The solution improves convenience of data reading control. For another example, during reading control, a data backup buffer or the like may be set for a photosensitive area. For example, backup and buffering are performed for data captured by the photosensitive area in different exposure sub-periods, and therefore, the data separately captured by the photosensitive area in the different exposure sub-periods is buffered for an appropriate reading time, and then corresponding data is read, thereby improving flexibility and convenience of data reading control.

Both start exposure difference control performed on different photosensitive areas and a solution for capturing an HDR in a photosensitive area may be used, so as to improve image capture quality. For example, as shown in FIG. 2a, FIG. 2c and FIG. 2d, capture of the photosensitive areas A1, A2 and A3 is completed in parallel in the total capture time T3 of the photosensitive array (wherein the start exposure time of the photosensitive area A1 is later than the start exposure time of the photosensitive area A2, and the start exposure time of the photosensitive area A2 is later than the start exposure time of the photosensitive area A3), and data captured by the photosensitive area in different exposure sub-periods is read multiple times in exposure periods of a photosensitive area (for multiple times of reading in one exposure period, multiple groups of data of different exposure extents of the photosensitive area may be acquired in the same exposure period). In a data reading aspect, a flexible reading policy may be used to resolve reading of different groups of exposure data to avoid a conflict for example, during T1t to T2t, a trigger condition of reading data (1) captured by the photosensitive area A1 in the exposure period T1 is satisfied, and a trigger condition of reading data (2) captured by the photosensitive area A3 in the exposure sub-periods T30 to T1t is also satisfied. In the situation, if data is read in a form of sharing a read circuit, reading of the data (1) and reading of the data (2) may be staggered according to a control policy, so as to avoid a conflict that may occur because of reading of different groups of data. The control policy may comprise but not limited to a row sequence number order (for example, during T1t to T2t, the data (1) is read first, and then the data (2) is read), a photosensitive area priority (for example, the data (2) whose HDR capture priority is relatively high is read first, and then the data (1) is read) and the like, which is not limited in this application.

Persons skilled in the art can understand that, in any one of the foregoing methods of the specific implementation manners of this application, the value of the sequence number of each step does not indicate an execution order, and the execution order of the steps should be determined according to a function and an inherent logic thereof, and should not form any limit to the implementation process of the specific implementation manners of this application.

Figure 4:
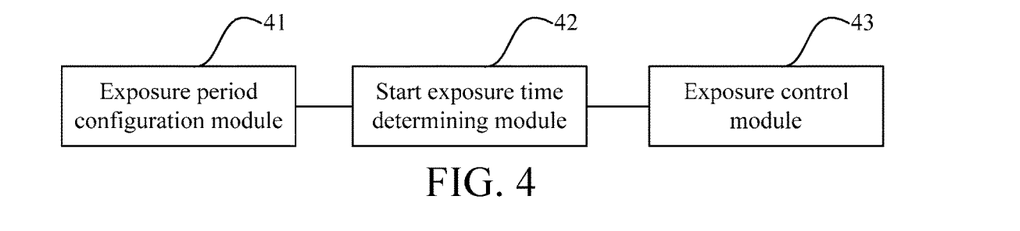
FIG. 4 is a logic block diagram of a first image capture control apparatus provided in an embodiment of this application.

FIG. 4 is a logic block diagram of an image capture control apparatus provided in an embodiment of this application. As shown in FIG. 4, the image capture control apparatus provided in this embodiment of this application comprises: an exposure period configuration module 41, a start exposure time determining module 42 and an exposure control module 43.

The exposure period configuration module 41 is configured to configure different exposure periods for at least two photosensitive areas of a photosensitive array.

The start exposure time determining module 42 is configured to determine start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods.

The exposure control module 43 is configured to control exposure of the corresponding photosensitive areas according to the determined exposure periods and the start exposure times of the exposure periods.

According to the solutions provided in the embodiments of this application, different exposure periods are configured for at least two photosensitive areas of a photosensitive array, different start exposure times are determined for the different exposure periods (a relatively long exposure period begins exposure relatively early, and a relatively short exposure period begins exposure relatively late), and then the photosensitive areas are controlled in parallel to successively begin exposure, and therefore, image capture of the photosensitive array is completed in a longest exposure period of the exposure periods, which improves exposure efficiency, and helps reduce an offset extent of an average center of different parts of a same relative motion object of sub-images captured by different photosensitive areas. In a dynamic scenario (such as a scenario in which a relative motion exists between the photosensitive array and a shot object), calculation complexity needed by synthesis of an HDR image based on sub-images is improved, motion blur of the synthesized HDR image is reduced, and quality of the HDR image is improved.

The image capture control apparatus performs image capture control by executing the image capture control method. The device representation form of the image capture control apparatus is not limited. For example, the image capture control apparatus may be an independent component (the independent component may be but not limited to a data handling module or control circuit), and the component performs image capture by controlling a photosensitive array. Alternatively, for another example, the image capture control apparatus may be used as a module or control circuit and integrated as a part of an image capture device comprising the photosensitive array, so as to implement image capture control on the photosensitive array, and the like. The image capture control apparatus performs control such as signal resetting, and/or signal output on the photosensitive unit in a manner of outputting a control signal to the photosensitive array.

Figure 5:
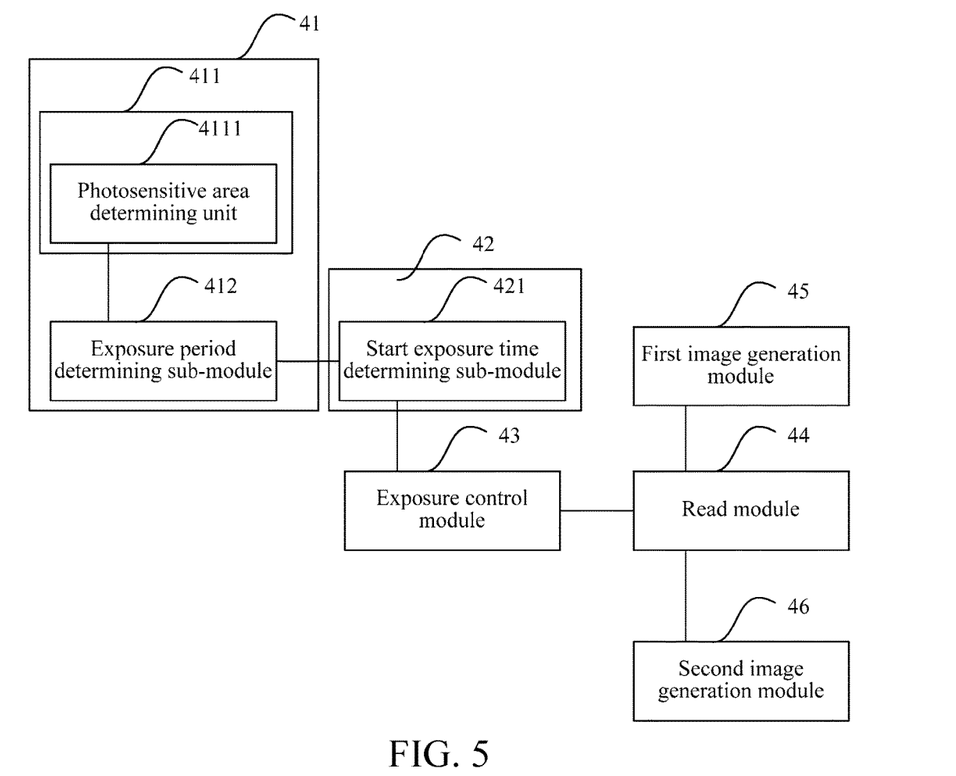
FIG. 5 is a logic block diagram of a second image capture control apparatus provided in an embodiment of this application.

Optionally, as shown in FIG. 5, the start exposure time determining module 42 comprises: a start exposure time determining sub-module 421. The start exposure time determining sub-module 421 is configured to align midpoints of the exposure periods to determine the start exposure times of the photosensitive areas relative to a reference time. Exposure control of the corresponding photosensitive area is performed by using the exposure parameter determined in the solution, and the offset of the average center of the sub-images separately captured by the exposure areas may be reduced as much as possible, thereby simplifying calculation complexity of performing subsequent synthesis processing such as object alignment based on the sub-images, and improving quality of the synthesized HDR image. Optionally, the reference time is a start exposure time of a photosensitive area corresponding to the longest exposure period. In the solution, a start exposure time of another exposure period is determined by using the start exposure time of the photosensitive area corresponding to the longest exposure period as the reference time, which is convenient to control.

Optionally, the exposure period configuration module 41 comprises: a photosensitive area determining sub-module 411 and an exposure period determining sub-module 412. The photosensitive area determining sub-module 411 is configured to divide the photosensitive array into the at least two photosensitive areas; and the exposure period determining sub-module 412 is configured to configure different exposure periods for the at least two photosensitive areas according to optical parameter distributions corresponding to the at least two photosensitive areas. In the solution, the corresponding exposure periods are configured according to the optical parameter distribution of the photosensitive area, and therefore, the configured exposure periods adapt to the optical parameter distribution of the photosensitive area, and effective balance is performed between exposure efficiency and sub-image capture quality. Further, optionally, the photosensitive area determining sub-module 411 comprises: a photosensitive area determining unit 4111. The photosensitive area determining unit 4111 is configured to divide the photosensitive array into the at least two photosensitive areas according to an optical parameter distribution of a sampling image of a scenario. In the solution, division of photosensitive areas is determined with reference to shooting and sampling situations of a scenario, and different exposure control is performed based on the photosensitive areas obtained through division, thereby improving image capture quality.

Optionally, each photosensitive area of the at least two photosensitive areas comprises at least one row of photosensitive units. The photosensitive array may be a photosensitive array supporting line-by-line driving. For example, the photosensitive array may be a photosensitive array in a rolling-curtain-type image sensor, or, the photosensitive array may be a digital image sensor supporting driving control performed by using a row as a unit, and the like, and is applied widely.

Optionally, each photosensitive area of the at least two photosensitive areas comprises at least one photosensitive unit. The solution is used to perform fine division on photosensitive areas and different exposure control, thereby improving image capture quality.

Optionally, the apparatus further comprises: a read module 44. The read module 44 is configured to read data captured by the photosensitive areas in the corresponding exposure periods. A specific manner of data reading is not limited in this embodiment of this application, and an implementation manner is quite flexible.

Optionally, the apparatus further comprises: a first image generation module 45. The first image generation module 45 is configured to generate an image according to the data captured by the photosensitive areas. The generated image is an HDR image, and a manner of generating an HDR image is quite flexible, which is not limited in this embodiment of this application.

Figure 6:
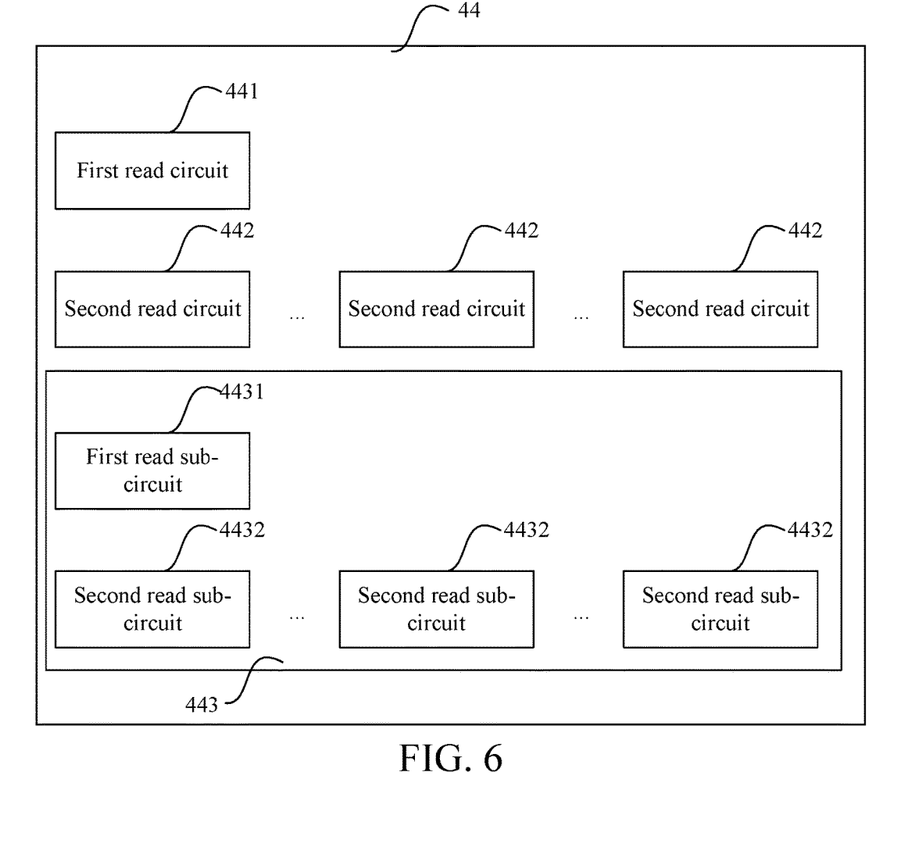
FIG. 6 is a logic block diagram of a read module provided in an embodiment of this application.

Further, optionally, as shown in FIG. 6, the read module 44 may comprise: a first read circuit 441. The first read circuit 441 is configured to read, during exposure completion of a photosensitive area having a relatively short exposure period to exposure completion of a photosensitive area having a relatively long exposure period, data captured by the photosensitive area having the relatively short exposure period in the exposure period of the photosensitive area; and read, in response to data reading completion of the photosensitive area having the relatively short exposure period and exposure completion of the photosensitive area having the relatively long exposure period, data captured by the photosensitive area having the relatively long exposure period in the exposure period of the photosensitive area. The first read circuit 441 may comprise but not limited to an A/D converter and/or a buffer. In such data reading control, the read circuit may be shared, so as to reduce costs, and avoid a data reading conflict between different photosensitive areas.

Optionally, the read module 44 may comprise: multiple second read circuits 442, wherein each of the second read circuits 442 is configured to read, in response to exposure completion of one of the photosensitive areas, data captured by the photosensitive area in a corresponding exposure period. In the solution, different photosensitive areas may separately correspond to different read circuits, and data captured by corresponding photosensitive areas is separately read by using multiple read circuits, thereby improving convenience of data reading control.

Optionally, the read module 44 may comprise: a third read circuit 443. The third read circuit 443 is configured to read data respectively captured in at least two exposure sub-periods of an exposure period of one photosensitive area, wherein the at least two exposure sub-periods at least comprise a first exposure sub-period and a second exposure sub-period, and the second exposure sub-period comprises the first exposure sub-period and is longer than the first exposure sub-period. The solution may further improve image capture quality on the basis of not increasing the exposure time length.

Further, optionally, the third read circuit 443 comprises: a first read sub-circuit 4431. The first read sub-circuit 4431 is configured to read, during expiration of the first exposure sub-period and non-expiration of the second exposure sub-period, data captured by the photosensitive area in the first exposure sub-period; and read, in response to reading completion of the data captured by the photosensitive area in the first exposure sub-period and expiration of the second exposure sub-period, data captured by the photosensitive area in the second exposure sub-period. In such data reading control, the read circuit may be shared, so as to reduce costs, and avoid a conflict of performing data reading multiple times by the photosensitive area in the exposure period.

Optionally, the third read circuit 443 comprises: multiple second read sub-circuits 4432, wherein each of the second read sub-circuits 4432 is configured to read, in response to expiration of an exposure sub-period, data captured by the photosensitive area in a corresponding exposure sub-period. In such data reading control, the read circuit may be shared, so as to reduce costs, and avoid a conflict of performing data reading multiple times by the photosensitive area in the exposure period, thereby improving convenience of data reading control.

Optionally, the apparatus further comprises: a second image generation module 46. The second image generation module 46 is configured to generate a sub-image according to the data captured by the photosensitive area in the exposure sub-periods, and generate an image according to the sub-image and data that is captured by other photosensitive areas. In the solution, a sub-image is generated according to the data captured by the photosensitive area in the exposure sub-periods, and then the sub-image of the photosensitive area and sub-images of other photosensitive areas in the photosensitive array are synthesized, so as to generate an HDR image corresponding to the photosensitive array, thereby further improving image capture quality on the basis of not increasing the exposure time length.

Figure 7:
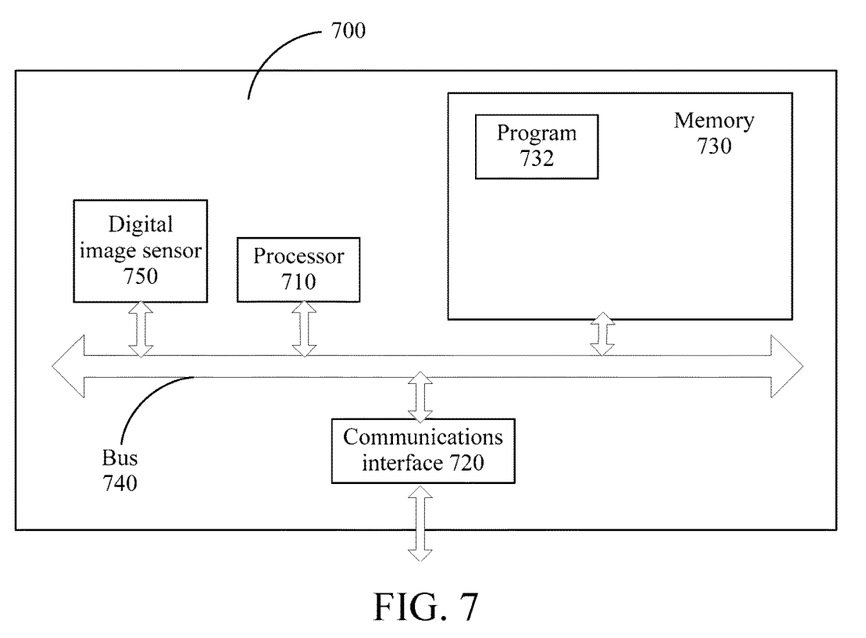
FIG. 7 is a logic block diagram of an image capture device provided in an embodiment of this application.

FIG. 7 is a schematic structural diagram of an image capture device provided in an embodiment of this application. Specific embodiments of this application do not limit specific implementation manners of the image capture device 700. As shown in FIG. 7, the image capture device 700 may comprise:

a processor 710, a communications interface 720, a memory 730, a communication bus 740 and a digital image sensor 750.

The processor 710, the communications interface 720, and the memory 730 communicate with each other through the communication bus 740.

The communications interface 720 is configured to communicate with the digital image sensor 750 and the like.

The processor 710 is configured to execute a program 732, and may specifically execute related steps in any one of the foregoing method embodiments.

The digital image sensor 750 comprises a pixel unit array. At least some units in the pixel unit array are provided with or connected to an analog-to-digital converter that is configured to convert an optical signal captured by a pixel unit into an electrical signal and then transmit the electrical signal, and/or communicate with another pixel unit in a digital domain, for example, perform signal transmission with another pixel unit in a digital domain.

For example, the program 732 may comprise program code, wherein the program code comprises a computer operation instruction.

The processor 710 may be a central processing unit (CPU), or an application specific integrated circuit (ASIC), or one or more integrated circuits that are configured to implement this embodiment of this application.

The memory 730 is configured to store the program 732. The memory 730 may comprise a random access memory (RAM), and may further comprise a non-volatile memory, for example, at least one disk memory.

For example, in an optional implementation manner, the processor 710 may perform the following steps by executing the program 732: configuring different exposure periods for at least two photosensitive areas of a photosensitive array; determining start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and controlling exposure of the corresponding photosensitive areas according to the determined exposure periods and the start exposure times of the exposure periods.

In another optional implementation manner, the processor 710 may further perform, by executing the program 732, a step mentioned in any other embodiment described above, and details are not described herein again.

For specific implementation of steps in the program 732, refer to corresponding description of related steps, modules, sub-modules, and units in the foregoing embodiment, which is not described herein. It may be clearly understood by a person skilled in the art that, for the purpose of convenient and brief description, for a detailed working process of the foregoing device and module, reference may be made to description about a corresponding process in the foregoing method embodiments, and details are not described herein again.

In the foregoing embodiments of this application, sequence numbers and/or orders of the embodiments are only for ease of description, but do not represent superiority or inferiority of the embodiments. Description for the embodiments has its own emphasis, and for a part without being described in detail in a certain embodiment, refer to relevant description in other embodiments. For related description about implementation principles or processes or effects or other details of the apparatus, device or system embodiments, refer to records of related description in the method embodiments, and details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and comprises several instructions for instructing a computer device (which may be a personal computer, a server, a network device, and the like) to perform all or a part of the steps of the method described in the embodiment of this application. The foregoing storage medium comprises: any medium that can store program codes, such as a USB flash disk, a removable hard disk, a read-only memory (ROM), a random access memory (RAM), a magnetic disk, or an optical disk.

In the embodiments of the apparatus, method, system and the like of this application, obviously, components (a system, a sub-system, a module, a sub-module, a unit, a subunit and the like) or steps may be decomposed, combined and/or decomposed and then recombined. The decomposition and/or recombination should be considered as an equivalent solution of this application. Moreover, in the above description about specific embodiments of this application, a characteristic described and/or shown for an implementation manner may be used in one or more other implementation manners in a same or similar manner, be combined with characteristics in other implementation manners, or be in place of characteristics in other implementation manners.

It should be emphasized that, the term "comprises/contains" when being used in this text means existence of a characteristic, an element, a step or a component, but does not exclude existence or addition of one or more other characteristics, elements, steps or components.

It should be noted that, the foregoing implementation manners are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. An image capture control method, comprising:
configuring different exposure periods for at least two photosensitive areas of a photosensitive array;
determining start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and
controlling exposure of the corresponding photosensitive areas according to the determined exposure periods and the start exposure times of the exposure periods, wherein the determining start exposure times of the photosensitive areas comprises: aligning midpoints of the exposure periods to determine the start exposure times of the photosensitive areas relative to a reference time;
reading, during exposure completion of a photosensitive area having a relatively short exposure period to exposure completion of a photosensitive area having a relatively long exposure period, data captured by the photosensitive area having the relatively short exposure period in the exposure period of the photosensitive area; and
reading, in response to data reading completion of the photosensitive area having the relatively short exposure period and exposure completion of the photosensitive area having the relatively long exposure period, data captured by the photosensitive area having the relatively long exposure period in the exposure period of the photosensitive area.

2. The method of claim 1, wherein the reference time is a start exposure time of a photosensitive area corresponding to the longest exposure period.

3. The method of claim 1, wherein the configuring different exposure periods for at least two photosensitive areas of a photosensitive array comprises:
dividing the photosensitive array into the at least two photosensitive areas; and
configuring different exposure periods for the at least two photosensitive areas according to optical parameter distributions corresponding to the at least two photosensitive areas.

4. The method of claim 3, wherein the dividing the photosensitive array into the at least two photosensitive areas comprises:
dividing the photosensitive array into the at least two photosensitive areas according to an optical parameter distribution of a sampling image of a scenario.

5. The method of claim 1, wherein each photosensitive area of the at least two photosensitive areas comprises at least one row of photosensitive units.

6. The method of claim 1, wherein each photosensitive area of the at least two photosensitive areas comprises at least one photosensitive unit.

7. The method of claim 1, wherein after the reading data captured by the photosensitive areas in the corresponding exposure periods, the method further comprises:
generating an image according to the data captured by the photosensitive areas.

8. The method of claim 1, wherein the reading data captured by the photosensitive areas in the corresponding exposure periods comprises:
separately reading, in response to exposure completion of the photosensitive areas, the data captured by the photosensitive areas in the corresponding exposure periods.

9. The method of claim 1, wherein the reading data captured by at least one photosensitive area of the photosensitive areas in an exposure period of the photosensitive area comprises:
reading data respectively captured in at least two exposure sub-periods of the exposure period of the photosensitive area, wherein the at least two exposure sub-periods at least comprise a first exposure sub-period and a second exposure sub-period, and the second exposure sub-period comprises the first exposure sub-period and is longer than the first exposure sub-period.

10. The method of claim 9, wherein the reading data respectively captured in at least two exposure sub-periods of the exposure period of the photosensitive area comprises:
reading, during expiration of the first exposure sub-period and non-expiration of the second exposure sub-period, data captured by the photosensitive area in the first exposure sub-period; and
reading, in response to reading completion of the data captured by the photosensitive area in the first exposure sub-period and expiration of the second exposure sub-period, data captured by the photosensitive area in the second exposure sub-period.

11. The method of claim 9, wherein the reading data respectively captured in at least two exposure sub-periods of the exposure period of the photosensitive area comprises:
separately reading, in response to expiration of the exposure sub-periods, the data captured by the photosensitive area in the corresponding exposure sub-periods.

12. The method of claim 9, wherein after the reading data respectively captured in at least two exposure sub-periods of the exposure period of the photosensitive area, the method further comprises:
generating a sub-image according to the data captured by the photosensitive area in the exposure sub-periods.

13. An image capture control apparatus, comprising:
an exposure period configuration module, configured to configure different exposure periods for at least two photosensitive areas of a photosensitive array;
a start exposure time determining module, configured to determine start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods;

an exposure control module, configured to control exposure of the corresponding photosensitive areas according to the determined exposure periods and the start exposure times of the exposure periods, wherein the start exposure time determining module comprises: a start exposure time determining sub-module, configured to align midpoints of the exposure periods to determine the start exposure times of the photosensitive areas relative to a reference time; and a read module, configured to read, during exposure completion of a photosensitive area having a relatively short exposure period to exposure completion of a photosensitive area having a relatively long exposure period, data captured by the photosensitive area having the relatively short exposure period in the exposure period of the photosensitive area; and read, in response to data reading completion of the photosensitive area having the relatively short exposure period and exposure completion of the photosensitive area having the relatively long exposure period, data captured by the photosensitive area having the relatively long exposure period in the exposure period of the photosensitive area.

14. The apparatus of claim 13, wherein the reference time is a start exposure time of a photosensitive area corresponding to the longest exposure period.

15. The apparatus of claim 13, wherein the exposure period configuration module comprises:
   a photosensitive area determining sub-module, configured to divide the photosensitive array into the at least two photosensitive areas; and
   an exposure period determining sub-module, configured to configure different exposure periods for the at least two photosensitive areas according to optical parameter distributions corresponding to the at least two photosensitive areas.

16. The apparatus of claim 15, wherein the photosensitive area determining sub-module comprises:
   a photosensitive area determining unit, configured to divide the photosensitive array into the at least two photosensitive areas according to an optical parameter distribution of a sampling image of a scenario.

17. The apparatus of claim 13, wherein each photosensitive area of the at least two photosensitive areas comprises at least one row of photosensitive units.

18. The apparatus of claim 13, wherein each photosensitive area of the at least two photosensitive areas comprises at least one photosensitive unit.

19. The apparatus of claim 13, wherein the apparatus further comprises:
   a first image generation module, configured to generate an image according to the data captured by the photosensitive areas.

20. The apparatus of claim 13, wherein the read module comprises:
   multiple second read circuits, wherein each of the second read circuits is configured to read, in response to exposure completion of one of the photosensitive areas, data captured by the photosensitive area in a corresponding exposure period.

21. The apparatus of claim 13, wherein the read module comprises:
   a third read circuit, configured to read data respectively captured in at least two exposure sub-periods of an exposure period of one photosensitive area, wherein the at least two exposure sub-periods at least comprise a first exposure sub-period and a second exposure sub-period, and the second exposure sub-period comprises the first exposure sub-period and is longer than the first exposure sub-period.

22. The apparatus of claim 21, wherein the third read circuit comprises:
   a first read sub-circuit, configured to read, during expiration of the first exposure sub-period and non-expiration of the second exposure sub-period, data captured by the photosensitive area in the first exposure sub-period; and read, in response to reading completion of the data captured by the photosensitive area in the first exposure sub-period and expiration of the second exposure sub-period, data captured by the photosensitive area in the second exposure sub-period.

23. The apparatus of claim 21, wherein the third read circuit comprises:
   multiple second read sub-circuits, wherein each of the second read sub-circuits is configured to read, in response to expiration of an exposure sub-period, data captured by the photosensitive area in a corresponding exposure sub-period.

24. The apparatus of claim 21, wherein the apparatus further comprises:
   a second image generation module, configured to generate a sub-image according to the data captured by the photosensitive area in the exposure sub-periods, and generate an image according to the sub-image and data that is captured by other photosensitive areas.

25. An image capture device, comprising:
   a digital image sensor, a processor, a communications interface, a memory and a communications bus, wherein the processor, the communications interface, the memory and the image sensor complete mutual communication by using the communications bus; and
   the memory is configured to store at least one instruction, wherein the instruction enables the processor to perform the following operations:
   configuring different exposure periods for at least two photosensitive areas of a photosensitive array;
   determining start exposure times of the photosensitive areas, wherein a start exposure time of a photosensitive area having a relatively long exposure period is earlier than a start exposure time of a photosensitive area having a relatively short exposure period, and exposure of the photosensitive areas is completed in a longest exposure period of the exposure periods; and
   controlling exposure of the corresponding photosensitive areas according to the determined exposure periods and the start exposure times of the exposure periods, wherein the determining start exposure times of the photosensitive areas comprises: aligning midpoints of the exposure periods to determine the start exposure times of the photosensitive areas relative to a reference time;
   reading, during exposure completion of a photosensitive area having a relatively short exposure period to exposure completion of a photosensitive area having a relatively long exposure period, data captured by the photosensitive area having the relatively short exposure period in the exposure period of the photosensitive area; and
   reading, in response to data reading completion of the photosensitive area having the relatively short exposure period and exposure completion of the photosensitive area having the relatively long exposure period, data captured by the photosensitive area having the relatively long exposure period in the exposure period of the photosensitive area.

\* \* \* \* \*